May 28, 1935.  E. A. ECKHOUSE  2,002,630
SHAMPOO FIXTURE
Filed Feb. 9, 1934  2 Sheets-Sheet 1

INVENTOR
EDGAR A. ECKHOUSE
BY
Brockett, Hyde, Higley & Meyer
ATTORNEYS

May 28, 1935.                E. A. ECKHOUSE                2,002,630
                              SHAMPOO FIXTURE
                           Filed Feb. 9, 1934            2 Sheets-Sheet 2

INVENTOR
EDGAR A. ECKHOUSE
BY
Brockett, Hyde, Higley + Myers
ATTORNEYS

Patented May 28, 1935

2,002,630

UNITED STATES PATENT OFFICE 2,002,630

SHAMPOO FIXTURE

Edgar A. Eckhouse, Cleveland Heights, Ohio

Application February 9, 1934, Serial No. 710,480

4 Claims. (Cl. 277—8)

This invention relates to faucet appliances of the type known as diverter valves wherein a pair of outlets are provided and whereby outflow is confined selectively to one or the other outlet. A common use for such an appliance is in connection with the lavatory of a barber shop or the like, where one outlet is by way of a flexible tubing terminating in a spray head, and the other outlet is simply the usual nozzle arranged to discharge into the basin of the lavatory. A similar application for such an appliance is in connection with a combined shower and tub bath. In either such usual case, individually controlled hot and cold water inlet connections are provided for the appliance, which is arranged to discharge either through the nozzle or through its other outlet, at the will of the operator.

This invention contemplates improvements in such appliances, a principal object of which is to provide selection of the two available outlets, by simple adjustment, on the part of the operator, of the nozzle through which outlet may be had, the nozzle being movably mounted relative to other parts of the appliance with which its inlet connections are made.

Other objects are to provide such a device of the simplest construction, and one which shall insure satisfactory service and permit ready accessibility to working parts which might ultimately require replacement. Another object is to provide a construction wherein but a single valve need be employed, arranged to seat in either of two relative positions to cut off the corresponding one of the two outlets.

Figure 1:
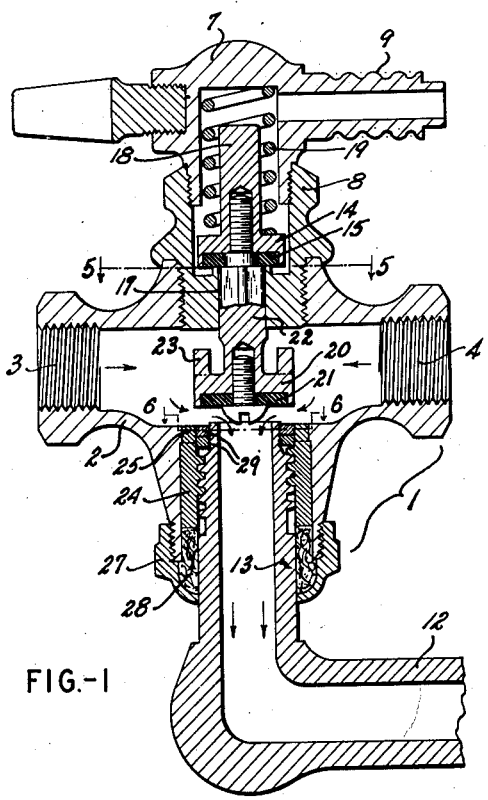
Figure 2:
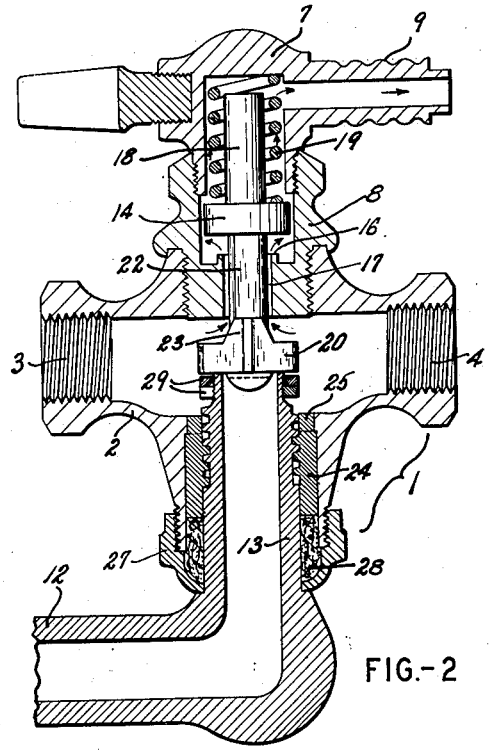
Figure 3:
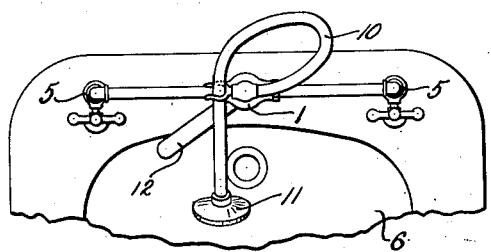
Figure 5:
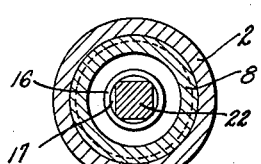
Figure 4:
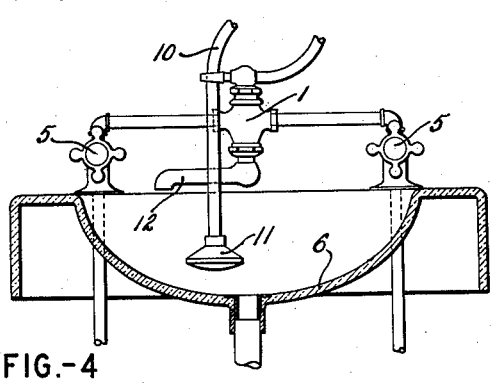
Figure 6:
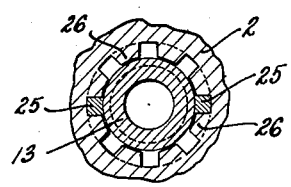
Figure 7:
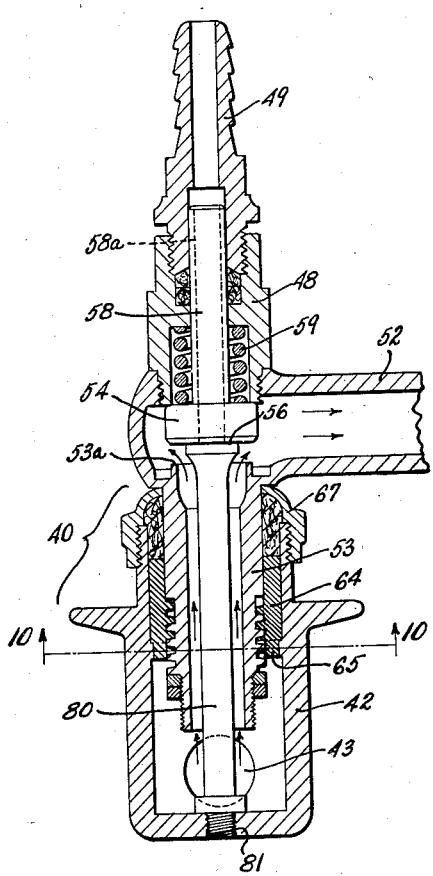
Figure 8:
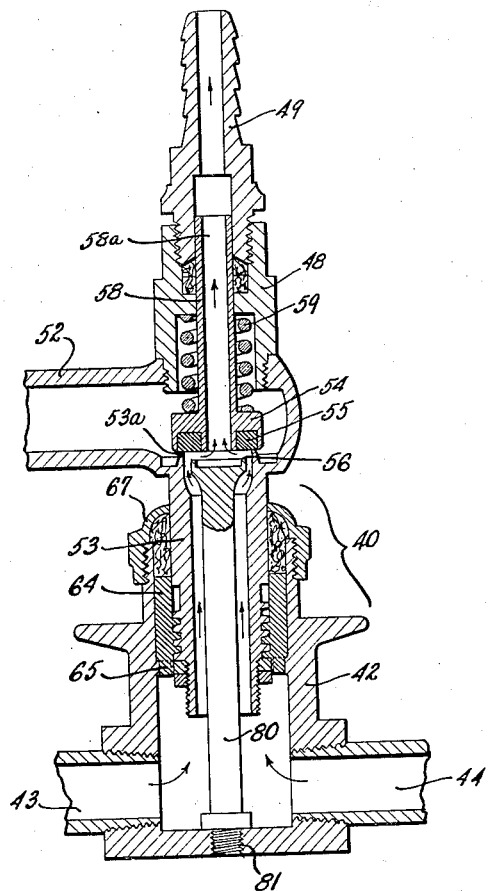
Figure 9:
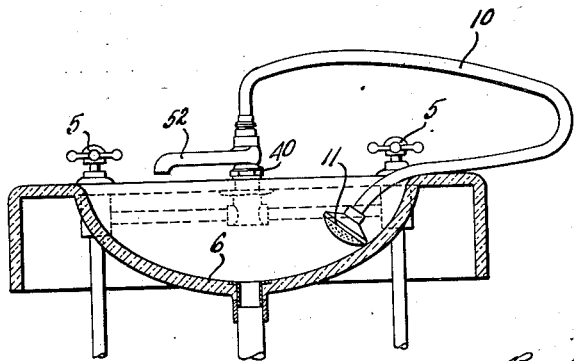
Figure 10:
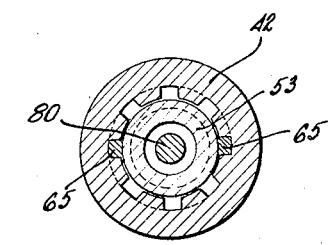

The exact nature of this invention together with further objects and advantages thereof will be apparent from the following description taken in connection with the accompanying drawings, in which Figs. 1 to 6 illustrate one embodiment of the invention, and Figs. 7 to 10 illustrate another embodiment. Figs. 1 and 2 are typical sectional elevations showing respectively the parts in their two characteristic positions; Figs. 3 and 4 are assembly views respectively in plane and elevation, illustrative of the manner of use of the appliance; and Figs. 5 and 6 are respectively transverse sectional details in the planes of lines 5—5 and 6—6, Fig. 1. Figs. 7 and 8 are sectional elevations illustrating the second form of the device with its parts in their two characteristic relations respectively; Fig. 9 is an assembly view illustrating the general arrangement of this form of the appliance; and Fig. 10 is a detailed transverse section as in the plane of line 10—10, Fig. 7.

With reference now to the drawings and first to Figs. 1–6 thereof, there is illustrated a form of the appliance adapted to be mounted elevated above a lavatory basin by its connection with hot and cold water inlet lines.

The appliance comprises a body generally indicated at 1, having a member 2 with inlet openings 3 and 4 threaded to provide the usual connection with oppositely directed inlet lines, from sources of hot and cold water respectively. As indicated in Figs. 3 and 4, these inlet lines each includes a valve 5 and associated piping so that the body 1 of the appliance is supported in elevated position relative to the basin 6 of the lavatory.

The appliance has a head 7 removably connected with the member 3 of the body by a nut 8, the head 7 having a nipple 9 adapted to receive the end of the usual flexible tubing 10 leading to a spray head 11.

The body is provided with a nozzle 12 having a stem part 13 opposite the head 7.

The parts described are chambered as illustrated to provide a pair of outlets, one through the spray 11 by way of the nipple 9 and the other through the nozzle 12, and each from both of the inlets 3 and 4. Valve means to be described are arranged, however, to provide that outflow shall be through one or the other only of the outlets, at the will of the operator.

The body 1 is chambered to receive a valve 14 having a gasket 15 seating against a face 16 annular about an opening 17; the opening 17 being in series relation between the spray outlet and the inlets and the valve 14 thus obviously controlling spray outflow. The valve has a stem part 18 extending into the cavity of the head 7, wherein a compression spring 19 is arranged, about the stem 18, to yieldably maintain the spray valve 14 in closed position upon its seat 16.

A valve 20 having a gasket 21 is secured with the spray valve 14 as by the stem 22 threaded into the stem of the valve 14, shouldered to retain the gasket 15, and cut away as indicated Fig. 5, to permit flow through the opening 17. The two valves 20 and 14 are thus rigidly interassociated and mounted in the body of the appliance for both rotation and sliding motion against the spring 19; and may thus be considered as a single valve having two seating faces, each at one of the gaskets. Motion of this dual valve unit in a direction to unseat the spray valve, is limited by projections 23 upon the valve head 20 adapted to engage the end of the nut 8, without obstructing flow into the opening 17 toward the spray head 11.

The nozzle stem 13 is aligned with the valve assembly just described. The end of the stem is adapted to seat upon the gasket 21, and is made adjustable along its axis to provide valve control for the nozzle outflow. That such control may be had convenient to the operator, the nozzle stem 13 is mounted in threaded relation with the body 1, so that swinging motion of the nozzle 12 will produce longitudinal adjustment of its stem 13 in the body 1.

For this purpose and to provide easy assembly, accessibility and replacement, a sleeve 24 is arranged in the main body casting 2, about the nozzle stem 13, these parts having interengaging threads as indicated in the drawings, the sleeve 24 being prevented from rotation in the member 2 when the assembly is complete, yet being permitted rotative adjustment for indexing the nozzle, by teeth 25 on the end of the sleeve, engaging teeth 26 in the member 2 as indicated in Fig. 6. This toothed arrangement also provides a stop for the sleeve 24 which is maintained in the assembly by a cap 27 and packing 28 therewithin, which arrangement also obviously provides a seal against leakage about the nozzle. The stem 13 is threaded at its end to receive a stop nut 29 engageable with the end of the threaded part of the sleeve 24 to limit outturning motion of the nozzle, the nut being so proportioned that it will not interfere with the seating of the nozzle stem against its valve gasket 21.

The parts are so proportioned and arranged, and particularly the interengaging threads between the nozzle and its sleeve are so located and pitched, that by a relatively slight swinging of the nozzle, such as that indicated Fig. 3, the end of its stem may be adjusted between the two positions indicated respectively in Figs. 1 and 2. In the position of Fig. 1 there is substantial clearance between the nozzle stem and its valve to permit unrestricted outflow through the nozzle, the spray valve being seated by the spring 19 so that there is no outflow through the spray, such flow conditions being indicated by the arrows, Fig. 1. In the position of Fig. 2 the stem 13 is seated against its valve and has moved the valve unit to unseat the spray valve part thereof, so that there will be no flow through the nozzle but outflow through the spray, such flow conditions being indicated by the arrows in Fig. 2.

With reference now to the modification of Figs. 7 to 10, an arrangement is shown which is adapted to be employed in a fitting arrangement generally concealed, as indicated in Fig. 9, wherein the body part of the appliance and the inlet piping thereto, are located beneath the lavatory, with its two outlets, however, extending thereabove.

The valve body is here generally designated 40, having its principal member, 42, chambered to provide a cavity into which the two inlets, 43 and 44, deliver. The nozzle 52 has a stem part 53 movably mounted with respect to the body 40 generally as before, a sleeve 64 being employed, secured in indexed position by toothed interengagement with the body member 42 as at 65, sealed as by the cap 67, the nozzle stem 53 being in threaded relation with the sleeve 64, all as will be apparent from Figs. 7 and 8 in the drawings, and in relations generally similar to those of the modification of Figs. 1 and 2. The nozzle is provided at the base of its stem, with a valve seat 53a annular about the axis of its stem part 53, which has the through opening indicated. In this opening is positioned a post 80, secured in the body member 42 as at 81 and terminating in an annular seating face 56, generally adjacent and within the seat 53a. Carried by the nozzle as indicated is a nut 48 and nipple 49 having the through openings indicated to provide an outlet from the appliance to a spray head as will appear. Within the cavity thus formed is a valve 54 having a gasket 55 seatable upon either or both of the seating faces 53a and 56, and having a stem 58 about which is positioned a spring 59. The stem 58 is hollow to provide a through passage 58a by way of the valve to the spray outlet. It will be apparent that the described mounting of the valve is such that it is yieldably maintained by the spring 59, seated against one or the other of the described annular seats, whichever is nearer.

The proportioning and arrangement of the parts is such that swinging adjustment of the nozzle through a reasonably small angle will effect longitudinal adjustment of its stem part generally between the two relative positions indicated in Figs. 7 and 8. It will be apparent that with the parts in the position of Fig. 7, flow will be had from the inlets solely through the nozzle as indicated by the arrows, the relation of the parts being such that the valve 54 is raised from the nozzle outlet seat 53a by the spray outlet seat 56, which latter prevents outflow through the spray outlet. In the relation of the parts indicated in Fig. 8, on the contrary, the nozzle is raised relative to the post 80, to close its seat 53a against the valve 54 and raise the latter from the spray outlet seat 56. Thus flow will now be had as indicated by the arrows, entirely to the spray head and none out through the nozzle.

Operation of both forms of the device will be generally similar. In each, outflow volume and temperature will be dependent upon setting of the hot and cold water valves, and discharge will be selectively to and by way of either the nozzle outlet or the spray outlet, dependent upon swinging adjustment of the nozzle.

In practice, in installing the device the parts are arranged, by indexing adjustment of the sleeve in which the nozzle stem is threaded, so that when discharge is out through the nozzle, the nozzle will discharge into the basin of the lavatory. Preferably also, the proportioning and arrangement is such that the nozzle adjustment to divert discharge to the spray head is sufficiently slight that under this condition also the nozzle will be above the lavatory so that the latter may catch any dripping.

What I claim is:

1. In a diverter faucet appliance, a chambered body having openings providing inlet and a pair of outlets, one of the outlets being adapted for connection to a spray head, a nozzle member for the other outlet, threadedly mounted in said body for adjustment relative thereto, and valve means for said outlets and arranged to alternately close the latter selectively dependent upon said nozzle adjustment, and comprising a stationary seating member secured with said body, a seating member concentric therewith carried by said nozzle, and a valve yieldably mounted in said nozzle to yieldably seat against both said seating members, and to be unseated from either by the other.

2. In a diverter faucet appliance, a chambered body having openings providing inlet and a pair of outlets, one of the outlets being adapted for connection to a spray head, a nozzle member for the other outlet, threadedly mounted in said body for adjustment relative thereto, and valve means for said outlets and arranged to alternately close the latter selectively dependent upon said nozzle adjustment, and comprising a seating member stationary with said body, a seating member arranged to provide an annular passage thereabout and carried by said nozzle, and a valve yieldably mounted in said nozzle to yieldably seat against both said seating members and to be unseated from either by the other, said annular passage leading from the chamber of said body to said valve, said nozzle having its passage communicating with said annular passage dependent upon seating of the nozzle seating member, and said valve having a passage providing communication between said annular passage and said spray outlet dependent upon seating of said valve, against said stationary seating member.

3. In a diverter faucet appliance, a chambered body having openings providing an inlet and a pair of outlets, one of the outlets being adapted for connection to a spray head, a nozzle member for the other outlet threadedly mounted in said body for swinging adjustment relative thereto and having a seating member annular about the axis of swing to have adjustment longitudinal of said axis dependent upon said swing, a valve mounted in said nozzle to seat against said seating member and to be yieldably urged thereagainst, and having a through passage leading to said spray outlet, and a stationary seating member secured with said body to seat against said valve within said nozzle seating member, and to provide a passage from the chamber of said body to said valve, whereby dependent upon adjustment of said nozzle means, said valve will yieldably seat against both said seating members or be unseated from either by the other to selectively permit outflow by way of the nozzle or the spray opening.

4. In a faucet appliance of the class described, a chambered body having openings providing inlet and a pair of outlets, a nozzle for one of said outlets adjustable relative to said body, valve means movably mounted in said nozzle, said body and nozzle each having a seating face cooperable with said valve means, each to control one of said outlets, said parts being so proportioned and arranged that said outlets may be alternately closed selectively dependent upon nozzle adjustment.

EDGAR A. ECKHOUSE.